United States Patent [19]

Tessler

[11] 4,017,460
[45] Apr. 12, 1977

[54] NOVEL STARCH ETHERS
[75] Inventor: Martin M. Tessler, Edison, N.J.
[73] Assignee: National Starch and Chemical Corporation, Bridgewater, N.J.
[22] Filed: Dec. 10, 1975
[21] Appl. No.: 639,490
[52] U.S. Cl. .............................. 536/50; 260/534 R; 536/48; 536/49
[51] Int. Cl.² ........................................ C08B 31/08
[58] Field of Search ............ 536/108, 110, 111, 48, 536/49, 50

[56] References Cited
UNITED STATES PATENTS
3,728,332  4/1973  Tessler et al. ................. 260/233.3

Primary Examiner—Melvyn I. Marquis
Attorney, Agent, or Firm—Edwin Szala; Ellen T. Dec

[57] ABSTRACT

A reagent useful for the chemical modification of starch is prepared by the reaction of a 2,3-dihalopropionic acid or alkyl ester thereof with a secondry amine. The reaction of the reagent with starch, carried out in an aqueous solution under controlled conditions, produces novel amino acid ether derivatives which are characterized by the presence of both a cationic and an anionic substituent group on the same reactive site. The resulting starch ethers are characterized by their stability, their ability to form cooked pastes which are more resistant to gelling upon cooling and their lowered gelatinization temperatues.

6 Claims, No Drawings

NOVEL STARCH ETHERS

BACKGROUND OF THE INVENTION

This invention relates to a method for preparing modified starch products containing substituent groups comprised of anionic carboxyl groups having cationic amine groups bonded directly thereto. The invention also discloses a novel reagent useful in the modification of starches.

The modification by starch by chemical derivatization and, in particular, the preparation of starch ethers and esters is well known in the art. There are also a number of methods known for chemically modifying starches so as to produce amphoteric starch products containing both anionic and cationic substituent groups. Most of these prior art methods involve either an "in situ" formation of the amphoteric starch by simultaneous reaction of two different modifying agents with the starch or a multi-step procedure wherein the modifications of the starch are carried out in sequence. The latter procedure is exemplified in U.S. Pat. No. 3,751,422 wherein starch is reacted with an alkylene oxide, a nitrogen containing etherifying agent and a sultone in a sequential manner. In the resulting products, the anionic and cationic substituent groups are bonded to different reactive sites on the starch molecule.

In contrast thereto, the amphoteric starch products of the present invention are produced by reaction directly with a novel reagent resulting in the production of starch products which are zwitterions, i.e. starches in which both the anionic and cationic substituent groups are bonded to the same reactive site on the starch molecule.

SUMMARY OF THE INVENTION

In accordance with the present invention, a novel reagent useful for the chemical modification of starch is prepared by the reaction of a 2, 3-dihalopropionic acid or an alkyl ester thereof with a secondary amine. The reaction of the resulting reagent with starch, carried out in an aqueous solution under controlled conditions, produces novel amino acid ether derivatives which are characterized by the presence of both a cationic and an anionic substituent group on the same reactive site.

The thus produced modified starch ethers are characterized by their greater stability, their ability to form cooked pastes which are more resistant to gelling upon cooling, and their lowered gelatinization temperatures, as compared to the corresponding untreated starches. These properties permit the derivatives of the invention to be utilized in a number of applications including uses in various sizings, coatings, thickeners, adhesives, etc.

DESCRIPTION OF THE PREFERRED EMBODIMENTS

The applicable starch base materials which may be used in preparing the starch ether products of the present invention may be derived from any plant source including corn, potato, sweet potato, wheat, rice, sago, tapioca, waxy maize, sorghum, high amylose corn, etc. Also included are the conversion products derived from any of the latter bases including, for example, dextrines prepared by the hydrolytic action of acid and/or heat; oxidized starches prepared by treatment with oxidants such as sodium hypochlorite; derivatized starch such as starch ethers and esters; and fluidity or thin boiling starches prepared by enzyme conversion or by mild acid hydrolysis. The use of the term "starch base" is thus seen to include any amylaceous substance, whether untreated or chemically modified which, however, still retains free hydroxyl groups capable of entering into the reaction of this invention. If the desired product is to be granular starch then obviously the initial starting material must be in granular form. It is to be noted that the method of the invention may also be carried out employing gelatinized starches which will result in the production of non-granular starch ethers.

The modifying agents used in the practice of the present invention are the reaction products of a 2,3-dihalopropionic acid or the corresponding $C_1$–$C_8$ alkyl ester thereof with a secondary amine under controlled reaction conditions. The 2,3-dihalopropionic acid or ester may be represented by the formula:

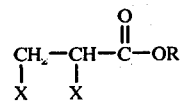

where X is bromine or chlorine and R is hydrogen or $C_1$–$C_8$ alkyl. Thus, for purposes of the invention the expression "dihalo" will be meant to include the dichloro and dibromopropionic species. Suitable compounds include 2,3-dibromopropionic acid, 2,3-dichloropropionic acid, 2-bromo-3-chloropropionic acid, as well as the methyl, ethyl, propyl, butyl, pentyl, hexyl, heptyl, and octyl esters thereof. The secondary amines used to produce the novel modifying agents correspond to the formula:

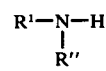

where R' and R'' are, independently, alkyl, alkenyl, or hydroxy or ether substituted alkyl or alkenyl wherein the total number of carbon atoms in R' and R'' combined is a maximum of 8. Suitable secondary amines include diethylamine, diallylamine, di-n-propylamine, di-iso-propylamine, di-t-butyl amine. 2-ethylaminoethanol, methyl allyl amine, 2-(ethylamino)ethyl ethyl ether, etc.

The exact structure of the modifying agent is not known with certainty. NMR data show that the reaction product is a complex mixture of many compounds. Four probable compounds which compose the majority of the reaction products in the mixture are as follows:

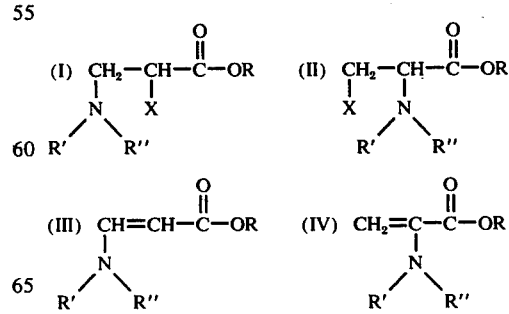

wherein X, R, R', and R'' are as identified above.

The preparation of the modifying reagents of the invention is carried out by reacting approximately equimolar amounts of the 2,3-dihalopropionic acid or ester with the secondary amine. Since one or two moles of acid are evolved during the reaction, depending on whether structures I and II or III and IV are formed, it will normally be necessary to neutralize the evolved acid with excess amine. The reaction is ordinarily carried out in an organic medium such as benzene or toluene at a temperature of about 20° to 110° C. for a period of 10 minutes to 18 hours. Higher temperature will require shorter reaction times. The reaction mixture is then cooled and the insoluble dialkylamine hydrohalide salt removed by filtration. The solvent is removed from the filtrate by distillation to yield a crude product. This crude product can be used directly to form the starch ether derivatives of the invention. However, if small amounts of unreacted ester or acid are present in the crude reagent, a slightly cross-linked starch product will be produced. The crude product can be purified by dissolving in an aqueous acid, extracting with a water-insoluble organic solvent, such as benzene, to remove unreacted ester or acid and then using the resulting purified aqueous solution to produce a modified starch which contains no cross-linking. If the product is purified and used in aqueous solution, solids contents in the range of 20 to 40% by weight are generally employed. Alternatively, the modifying reagent may be prepared in situ during reaction with the starch base as will be discussed hereinbelow.

It will be recognized by one skilled in the art that the structure of the zwitterionic starch ether in aqueous solutions will vary depending upon the pH of the solution. Moreover, to the extent that the modifying agent may exist as a mixture of compounds, the exact structure of the modified starches is not known with certainty. It is, however, reasonable to assume that stabilization is afforded by the presence of the reagent groups bound to the starch by covalent bonds. Under the alkaline reaction conditions, the ester group is hydrolyzed to a carboxylic acid group. The characteristic structure of the modified portions of the stable starch derivative will therefore depend on the actual structure of the reagent, the mechanism by which the modifier reacts with the starch and the stability of the initial starch product under the alkaline reaction conditions. For example, the modified portion of the starch may be typically represented by any one of the following general structures, i, ii, iii, or iv, or a combination of more than one of the structures:

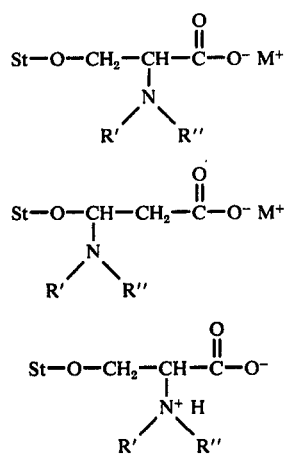

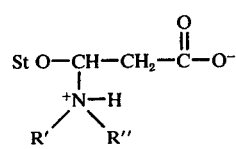

wherein St-O represents the starch molecule in which a hydrogen of a hydroxyl group of an anhydroglucose unit has been replaced by a substituent group derived from the modifying agent; M represents a cation and R′ and R″ are as previously defined.

The practitioner will recognize that the starch molecule is a polymer which contains many anhydroglucose units, each having three free hydroxyl groups (except the non-reducing end glucose units which contain four free hydroxyl groups) which may react with the modifying agent. Thus, the number of such displacements or the degree of substitution (D.S.) will vary with the particular starch, the ratio of the modifying agent to the starch and, to some extent, the reaction conditions. Furthermore, since it is known that the relative reactivity of each of the hydroxyl groups within the anhydroglucose unit is not equivalent, it is probable that some will be more reactive with the modifying agent than others.

The novel method of this invention comprises reacting a selected reagent, as described hereinabove, with a starch base which is suspended or dispersed in water. The reaction of the modifying agent with the starch base is carried out at temperatures ranging from about 10° to 90° C. The preferred temperature at which a granular starch reaction is carried out is from 20° to 50° C. and that for a non-granular starch reaction is from 20° to 75° C. It will be recognized that use of temperatures above about 60° C. with granular starches will result in granule swelling and filtration difficulties or gelatinization of the starch.

The pH of the reaction mixture is ordinarily controlled so as to be above 9.5 but below 12.5, with the preferred range being about 11.5 to 12.0. The pH is conveniently controlled by a periodic addition of a dilute aqueous solution of sodium hydroxide or other common base including potassium hydroxide, sodium carbonate, calcium hydroxide, tetramethylammonium hydroxide, etc. Alternately, the pH is not controlled but an excess of the base is added initially to maintain the required alkaline pH. Under certain conditions, it may also be desirable to add sodium sulfate to suppress swelling of the starch and to give a more filterable starch product.

The amount of modifying agent used to react with the starch base will vary from about 1 to 100%, preferably from 7 to 20%, based on the dry weight of the starch and dependent on such factors as the starch base employed, the degree of stabilization required in the end product and the particular modifying agent used.

Reaction time will vary from about 0.2 to 24 hours depending on such factors as the reactivity of the reagent, the amount of reagent, the temperature and pH employed, etc. After completion of the reaction, the pH of the reaction mixture is preferably adjusted to 3.0 to 7.0 with any common acid such as hydrochloric, sulfuric acetic, etc. The resultant modified starch, if in granular form, is then recovered by filtration, washed free of residual salts with water, and dried. Alternatively, the washed product may be drum dried, or spray dried, or gelatinized and isolated by alcohol precipitation or freeze drying. If the starch product is non-granular, it can be purified by dialysis to remove residual salts and isolated by alcohol precipitation or by freeze drying.

In accordance with the alternate embodiment wherein the modifying reagent is generated in situ during reaction with the starch, the separate components are added to an aqueous alkaline suspension of the starch and the mixture allowed to react in the manner described hereinabove at 20° to 55° C. for 0.5 to 16 hours and isolated by adjusting the pH with acid. The order of addition of the separate components is not critical however it is preferred that the amine be added before the dihalopropionate to minimize the amount of cross-linking in the resulting starch product.

The degree of stabilization of the novel starch derivatives depends on the reaction conditions employed and the amount of particular modifying agent used. The starch derivatives are characterized by their ability to yield thick, high viscosity dispersions which are cohesive and stable. The nitrogen content of any particular starch derivative may be determined by comparing the amount of nitrogen contained in the derivative with that of the non-reacted starch base, as determined by the Kjeldahl method.

It is thus seen that the novel process of this invention enables the practitioner to effectively prepare modified starches which are stabilized by the presence of zwitter-ion ether groups. Because of their unique properties, the novel products of this invention can be utilized in many industrial applications such as those employing suspending agents, thickeners, sizings, adhesives etc.

The following examples further illustrate the preferred embodiments of the invention although it will be appreciated that a large number of variations may be effected in reacting the starch base with the modifying agents in accordance with the reaction procedure described above without materially departing from the spirit and scope of the invention. In the examples, the parts are by weight, unless otherwise specified.

EXAMPLE I

This example illustrates the preparation of the starch ethers of this invention.

A total of 15.6 parts ethyl 2,3-dibromopropionate and 9.6 parts diethylamine was added to 132 parts benzene and the mixture stirred at 40° C. for 2 hours. The reaction mixture was cooled to room temperature (about 22° C.) and filtered. The benzene was removed from the filtrate by distillation in a rotary evaporator at 30° C. using a water aspirator to yield 18.1 parts of crude product. The crude product was added to 50.0 parts water, the pH was lowered to 1.5 with 10% aqueous and hydrochloric acid, and the aqueous solution extracted twice with 88 part portions of benzene. The pH was then raised to 7.0 by adding about 2.0 parts calcium hydroxide. The aqueous solution of the reagent weighed 80.4 parts.

A total of 33.1 parts of the aqueous solution prepared above was added to a slurry of 40.0 parts corn starch and 1.6 parts calcium hydroxide in 50 parts water. The mixture was agitated at 40° C. for 16 hours, the pH lowered to 3.0 with 10% aqueous hydrochloric acid, the starch isolated by filtration, washed three times with water and dried. The starch product was very swollen which resulted in slow filtration during the isolation and washing steps. The resulting starch product contained 0.51% nitrogen, by weight.

The above reaction was repeated in the identical manner except the amount of reagent solution was reduced to 13.6 parts and the amount of calcium hydroxide to 1.2 parts. The resulting starch product contained 0.26% nitrogen, by weight.

EXAMPLE II

This example illustrates the preparation of additional starch ethers of this invention using varied starch bases.

A total of 15.6 parts ethyl 2,3-dibromopropionate and 9.6 parts diethylamine was added to 132 parts benzene and the mixture refluxed for 45 minutes. The reaction was cooled to room temperature (about 22° C.) and filtered. The benzene was removed from the filtrate in a rotary evaporator at 30° C. (using a water aspirator) to yield 16.6 parts of crude product. The crude product was added to 50 parts water, the pH lowered to 1.5 with 10% aqueous hydrochloric acid (20.5 parts required), and the aqueous phase extracted twice with 88 part portions of benzene. The aqueous phase weighed 86.6 parts.

Into each of four beakers, designated samples A, B, C, and D were placed 11.0 parts of the aqueous reagent solution prepared above, 31 parts water, 0.9 parts calcium hydroxide and 30 parts starch base. The respective starch bases, each corresponding to the designated beaker are described as follows:

A — Waxy maize starch which had been treated with 7.0% propylene oxide and 0.02% phosphorus oxychloride.

B — Tapioca starch.

C — Corn starch oxidized by hypochlorite to a degree known in the trade as 50 fluidity.

D — Corn starch which contained 0.25% by weight, nitrogen, obtained by treating the starch with 3.0% diethylaminoethylchloride hydrochloride.

In each case, the resulting slurry was agitated at room temperature for 16 hours, the pH lowered to 3.0 with 10% hydrochloric acid, the starch isolated by filtration, washed three times with water and dried. Each dry starch product was analyzed for nitrogen and the results are given below:

| Starch Product | % Nitrogen, by weight |
|---|---|
| Sample A | 0.24 |
| Sample B | 0.19 |
| Sample C | 0.17 |
| Sample D | 0.41 |

EXAMPLE III

This example illustrates the preparation of additional starch ethers of this invention employing varied reaction conditions.

Variation of pH levels — A series of four starch ethers (Samples E, F, G, and H) was prepared by reacting starch and the etherifying reagent at varied pH levels as follows:

Sample E

A total of 3.5 parts of crude reagent prepared in Example I was added to 3.5 parts water and the pH lowered to 1.5 by adding 3.8 parts 10% aqueous hydrochloric acid. The water was extracted twice with 44 part portions of benzene and the pH of the aqueous phase raised to 6.0 by adding 2 parts of 20%, by weight, aqueous sodium hydroxide. A total of 50 parts corn starch was added to a solution of 15 parts sodium sulfate and 1.5 parts sodium hydroxide in 62.5 parts water and then the reagent solution prepared above was added. The pH of the resulting mixture was 12.1. The mixture was then agitated at room temperature for 16 hours, the pH lowered from 11.4 to 3.0 with 10% aqueous hydrochloric acid, the starch recovered by filtration, washes three times with water, and dried. The resulting product contained 0.29% nitrogen, by weight.

Sample F

A total of 30 parts corn starch was added to 40 parts water and the pH adjusted to 10.5. Then 11.0 parts of an aqueous solution (derived from 2.1 parts crude reagent) prepared in the identical manner as in Example II was added slowly while controlling the pH at 10.5 by periodically adding 3% aqueous sodium hydroxide. The starch was reacted at controlled pH 10.5 for 16 hours, the pH was lowered to 3.0 with 10% aqueous hydrochloric acid, the starch recovered by filtration, washed three times with water, and dried. The resulting product contained 0.17% nitrogen, by weight.

Sample G

This sample was prepared in the identical manner as Sample F except the pH was controlled at 11.0. The resulting product contained 0.16% nitrogen, by weight.

Sample H

This starch ether was prepared in the identical manner as Sample F except the pH was controlled at 11.4. The resulting product contained 0.13% nitrogen, by weight.

Variation of reaction temperature and times. — A series of starch ethers (Samples I, J, K, and L) was prepared by adding 30 parts corn starch to a solution of 11 parts reagent solution (prepared as described in Sample F) and 31 parts water, then adding 1.2 parts calcium hydroxide, and agitating at the desired temperature and reaction times. At the end of the reaction, the pH was adjusted to 3.0 by the addition of 10% aqueous hydrochloric acid, the starch recovered by filtration, washed three times, and dried. The particular reaction conditions and nitrogen analyses of the resulting products are summarized below:

| Starch Product | Reaction Temperature | Reaction Time hours | % Nitrogen, by weight |
|---|---|---|---|
| Sample I | 22° C. | 2 | 0.22 |
| Sample J | 22° C | 4 | 0.23 |
| Sample K | 22° C. | 6 | 0.22 |
| Sample L | 10° C. | 8 | 0.19 |

EXAMPLE IV

This example illustrates two preparations at two temperatures of non-granular, starch derivatives using a previously gelatinized starch base.

A total of 15.6 parts ethyl 2,3-dibromopropionate and 9.6 parts diethylamine was added to 132 parts benzene. The mixture was refluxed for two hours, cooled, and filtered. The benzene was removed from the filtrate by distillation to yield 15.3 parts of crude product. The crude product (15.0 parts) was added to 50 parts water and the pH was lowered to 1.5 with 10% aqueous hydrochloric acid. The aqueous solution was extracted twice with 88 part portions of benzene and the pH was then raised to 6.5 by adding a small portion of calcium hydroxide.

Reaction A

A slurry of 25 parts waxy maize which had been previously acid converted to a degree known in the trade as 85 fluidity was added to 100 parts water and heated in a boiling water bath for 20 minutes. The resulting starch dispersion was cooled to room temperature and the pH raised to 12.0 by adding 50% aqueous sodium hydroxide. A total of 83.3% of the aqueous reagent solution prepared above (derived from 12.5 parts crude product) was added to the starch dispersion and the mixture was stirred at room temperature (about 22° C.) for seventeen hours while controlling the pH at 12.0 by periodically adding 10% aqueous sodium hydroxide. The pH was then lowered to 3.0 with 10% aqueous hydrochloric acid, the starch product purified by dialysis and isolated by freeze drying. The resulting product contained 1.01% nitrogen, by weight.

Reaction B

This starch derivative was prepared by the identical procedure on Reaction A except 16.7% of the aqueous reagent solution prepared above (derived from 2.5 parts of crude product) was used and the reaction was carried out for three hours at controlled pH 11.5 and 70° C. The resulting product contained 0.26% nitrogen, by weight.

EXAMPLE V

This example illustrates the preparation of starch ether products of this invention by reacting starch with the etherification reagent prepared in situ.

Reaction X.

A total of 1.1 parts diethylamine was added to a slurry of 50.0 parts corn starch in 62.5 parts water. Then 3.9 parts ethyl 2,3-dibromopropionate and 1.5 parts calcium hydroxide was added and the mixture stirred at room temperature (about 22° C.) for 16 hours. The pH was then lowered to 3.0 with 10% aqueous hydrochloric acid and the starch isolated by filtration, washed three times with water and dried. The dried starch product contained 0.24% nitrogen, by weight.

Reaction Y

Reaction X was repeated in the identical manner except the reaction temperature was raised to 40° C. The dried starch product contained 0.28% nitrogen, by weight.

Reaction Z

A total of 50.0 parts corn starch was added to a solution of 1.5 parts sodium hydroxide and 15.0 parts sodium sulfate in 62.5 parts water. Then 0.75 parts diethylamine and 2.3 parts 2,3-dibromopropionic acid was added, the mixture agitated at 50° C. for 17 hours, cooled, the pH lowered from 11.0 to 5.0 with dilute sulfuric acid, the starch isolated by filtration, washed three times with water and dried. The resulting starch product contained 0.12% nitrogen, by weight.

EXAMPLE VI

This example illustrates additional preparations of starch ethers of this invention using various amines to prepare the etherification reagent.

The various etherification reagents were prepared in a manner identical to that employed in Example IV, except herein the various reagents were reacted at the concentrations set forth in the chart below.

| Reagent | Etherification Reagent I | Etherification Reagent II |
| --- | --- | --- |
| benzene | 22.0 | 22.0 |
| ethyl 2,3-dibromopropionate | 2.6 | 2.6 |
| diallylamine | 2.0 | — |
| 2-ethylaminoethanol | | 1.8 |
| Yield of crude reaction product | 3.2 | 1.8 |

Each of the etherification reagents prepared above was reacted with starch in the following manner. A total of 30 parts corn starch was added to 40 parts water. Then the reagent prepared above was added, 0.9 parts calcium hydroxide added, and the resulting slurry agitated at 40° C. for sixteen hours. The pH was lowered to 3.0 with 10% hydrochloric acid, the starch recovered by filtration, washed three times, and dried. On analyses, the starch ethers prepared with etherification reagent I and II contained 0.24, 0.13% nitrogen, by weight.

EXAMPLE VII

This example illustrates the preparation of additional starch ethers (Samples M and P) of this invention.

Reaction M

A total of 5.2 parts ethyl 2,3-dibromopropionate and 5.56 parts dibutylamine was added to 44 parts benzene. The mixture was refluxed for two hours, cooled, and filtered. The benzene was removed from the filtrate by distillation to yield 7.2 parts product.

Starch M

A total of 3.6 parts reagent of Reaction M was added to a slurry of 30 parts corn starch and 0.9 parts calcium hydroxide in 40 parts water. The resulting mixture was agitated at 40° C. for 16 hours, the pH lowered to 3.0 with 10% aqueous hydrochloric acid, the starch recovered by filtration, washed three times with water, and dried. The resulting starch product was found to contain 0.30% nitrogen, by weight.

Reaction P

A total of 11.2 parts n-octyl 2,3-dibromopropionate and 6.0 parts diethylamine was added to 88 parts benzene. The mixture was refluxed for two hours, cooled, and filtered. The benzene was removed from the filtrate by distillation to yield 12.4 parts product.

Starch P

A total of 6.2 parts reagent of Reaction P was added to a slurry of 40 parts corn starch and 1.2 parts calcium hydroxide in 50 parts water. The mixture was reacted, and the starch isolated and purified in the identical manner as Starch M. The resulting starch product contained 0.18% nitrogen, by weight.

EXAMPLE VIII

This example illustrates an additional preparation of a starch ether of this invention using ethyl 2,3-dichloropropionate to prepare the etherification reagent.

A total of 3.4 parts ethyl 2,3-dichloropropionate and 3.2 parts diethylamine was added to 22 parts benzene. The mixture was refluxed for two hours, cooled, and filtered. The benzene was removed from the filtrate by distillation to yield 4.4 parts crude product. A total of 2.2 parts crude product was added to 10 parts water and the pH lowered to 1.5 with 10% aqueous hydrochloric acid. The aqueous solution was extracted twice with 20 parts benzene and the pH was then raised to 7.0 by adding a small amount of calcium hydroxide.

A total of 30 parts water was added to the aqueous reagent solution prepared above, and then 30 parts corn starch and 0.9 parts calcium hydroxide were added. The mixture was agitated for 16 hours at 40° C, the pH lowered to 3.0 with 10% aqueous hydrochloric acid, the starch product recovered by filtration, washed three times with water, and dried. The resulting product contained 0.23% nitrogen, by weight.

EXAMPLE IX

This example illustrates the preparation of an additional starch ether of this invention where the reagent is prepared at a relatively low temperature.

A total of 7.8 parts ethyl 2,3-dibromopropionate and 4.8 parts diethylamine was added to 61 parts benzene and the mixture stirred at room temperature (about 22° C.) for 18 hours. The reaction was filtered and the benzene removed from the filtrate in a rotary evaporator at 30° C. to yield 8.2 parts crude product.

A total of 4.0 parts crude product prepared above was added to a slurry of 40.0 parts corn starch and 1.2 parts calcium hydroxide in 50.0 parts water. The mixture was agitated at 40° C. for 17 hours, the pH lowered to 3.0 with 10% aqueous hydrochloric acid, the starch isolated by filtration, washed with water, and dried. The resulting starch product contained 0.37% nitrogen by weight.

I claim:
1. A method for the preparation of modified starch products comprising the steps of:
   a. reacting starch base with 1 to 100% by weight of the starch base of modifying agent in an aqueous medium at a pH of 9.5 to 12.5 and a temperature of 10° to 90° C. for a period of 0.2 to 24 hours, said modifying agent comprising the reaction product of a 2,3-dihalopropionic acid or a $C_1$–$C_8$ alkyl ester thereof with a secondary amine of the formula:

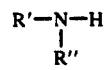

where R' and R'' are, independently, alkyl, alkenyl or hydroxy or ether substituted alkyl or alkenyl wherein the total number of carbon atoms in R' and R'' combined in a maximum of 8; and
   b. isolating the resulting starch product.
2. The method of claim 1 wherein the modifying agent is present in an amount of about 7 to 20% by weight of the starch base.
3. The method of claim 1 wherein the modifying agent is prepared in situ in the reaction medium immediately prior to its reaction with the starch base.
4. The method of claim 1 wherein the starch base is in granular form.
5. The method of claim 1 wherein the starch base is in non-granular form.
6. As a composition of matter, the starch derivative formed by the method of claim 1.

* * * * *